Figure 1:
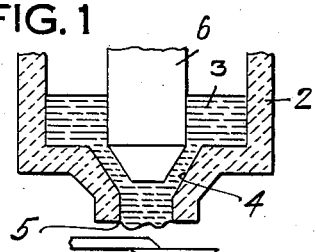

June 17, 1930.  G. E. HOWARD  1,763,968

METHOD OF DELIVERING AND SHAPING MOLTEN GLASS

Filed May 25, 1921

INVENTOR
George E. Howard
By Kay, Totten & Brown,
Attorneys

Patented June 17, 1930

1,763,968

UNITED STATES PATENT OFFICE

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

METHOD OF DELIVERING AND SHAPING MOLTEN GLASS

Application filed May 25, 1921. Serial No. 472,587.

This invention relates to the art of manipulating glass to form individual masses for the purpose of fabrication into bottles, pressed ware, sheets, or other forms, and it is more especially related to that class of glass delivery methods that form a gather either partially or wholly during its passage through an orifice in a containing receptacle, as distinguished from those methods whereby the glass is delivered from the receptacle continuously in a flowing stream, and the mass or charge is gathered, formed and cut off without interrupting the flowing stream.

In feeding glass in the form of successive drops or gobs, it is customary to make use of some sort of impulse device such as a plunger, and to give this plunger a reciprocating vertical motion whereby the natural discharge by gravity is augmented by the plunger action during a certain part of the formation of the gob and whereby the plunger is employed to neutralize or entirely overcome the gravity flow of glass after the gob is severed from the parent body adjacent to the orifice, thus providing the necessary pause for the transfer of molds or other shaping mechanism.

My invention is concerned with the gob or gather of glass after it issues from the discharge orifice and before it is received in a mold or other receptacle. My object is to secure a better shaping of the gob or gather, to control its temperature so as to make it more adaptable to later operations, to control the weight of the gob more closely and preserve a substantially constant weight under ordinary working conditions, to extend the range of sizes and weights of ware which this class of apparatus is capable of making, to extend the range of temperatures at which the glass can practically be formed into suspended gathers, and to modify the range of speed at which the gathers may be formed.

My invention is the result of efforts to adapt the existing gob feeding method to produce gathers or gobs of large size such, for example, as those required in making battery jars which may weigh as much as eight or ten pounds, or even more. In feeding the smaller sizes of gathers it is possible to maintain a good shape by varying the forces which act on the glass as it issues from the discharge orifice, and this control is particularly easy at high speeds, but as the weights of the gathers increase a point is reached where it is difficult to keep the shape of the gather constant and proper, and this invention adds to the prior gob-feeding system the step of acting upon the gather, between the severing shears and the mold, with shaping forces which maintain the correct shape of the descending gather and insure that it reaches the mold in proper condition as to shape and temperature.

The application of shaping forces to the gather on its way to the mold also increases the range of temperature and speed at which the gathers may be formed, and these factors are important in the handling of molten glass, as they change the viscosity of the glass and the friction exerted by it in passing the discharge orifice.

Figure 3:
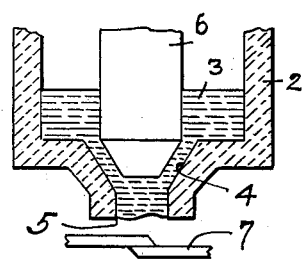
Figure 4:
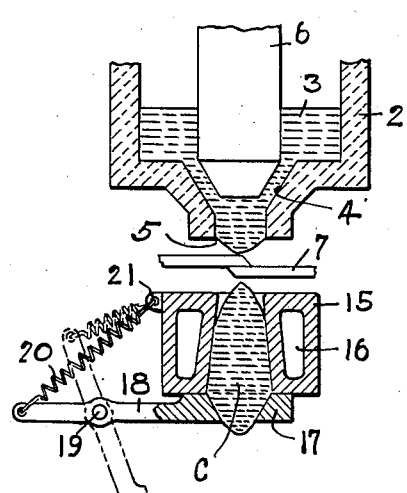
Figure 2:
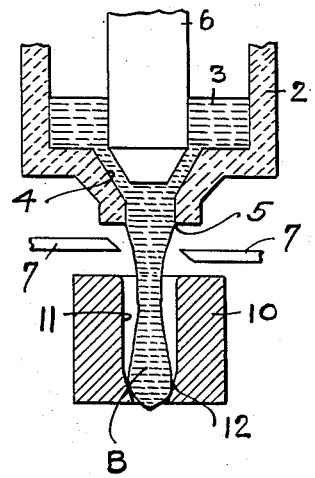
Figure 2:
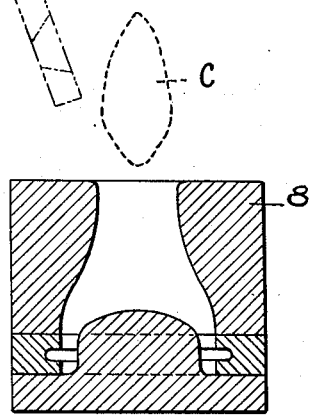

Some of the ways in which my invention may be carried into practice are shown in the accompanying drawings, in which Fig. 1 is a vertical sectional view of a portion of a plunger feeder and a mold, showing the improper feeding of a heavy gather, such as tends to result when my invention is not employed; Fig. 2 is a vertical sectional view showing the same plunger feeder portion and a simple form of retarding device acting on the gather below the shears; Fig. 3 is another view similar to Fig. 2 showing the manner in which the retarding device acts upon the gather; and Fig. 4 is a vertical sectional view of a plunger feeder and mold with another form of retarding device interposed between the shears and the mold.

All of the figures of the drawing are largely diagrammatic and are intended merely for the purpose of illustrating the invention, which may be carried out with various kinds of apparatus, as will be understood from the following description.

The drawing shows a gob feeder including a receptacle 2 which may be the forehearth or boot of a tank furnace or may be any other suitable receptacle for molten glass, which is shown at 3 within the receptacle 2.

The receptacle 2 has a downwardly inclined discharge orifice 4 communicating with an outlet 5 above which is mounted a vertical reciprocating plunger 6 which may be constructed and operated according to well known practice in this art. Below the discharge outlet 5 is a pair of coacting shears 7.

Fig. 1 shows a mold 8 which is spaced below the discharge opening of the feeder and is of a size to require a heavy gather. The gather, after it issues from the discharge outlet 5, tends to pull down and elongate, and at some point in its length will contract and pull away from the glass issuing from the orifice of the receptacle. The result is that the gob or gather assumes somewhat the shape shown at A, Fig. 1, which is obviously an improper shape for molding, as it will lap and coil in the mold, trapping bubbles and causing imperfections in the ware.

Figs. 2 and 3 show my simplest manner of applying shaping forces to the gathers as they descend into the molds. As here shown the shaping device consists of a cup or funnel 10 having a vertical opening 11, the lower walls of which taper downwardly and inwardly as shown at 12, while the upper walls may be either vertical and parallel or may taper upwardly and inwardly, producing a shape such as that of the retarding device shown in Fig. 4. The upper or inlet end of the opening end 11 must be larger than the maximum diameter of the gathers which pass through it, and the lower end of the opening is smaller than the maximum diameter of the gathers.

When a gather B is severed and permitted to fall through the opening 11 in the cup 10, the lower end of the gather is delayed in its downward movement by the lower converging walls of the cup 10, and this causes the gather to temporarily settle in the cup and slowly work through the opening in the bottom portion thereof. This prevents the point of the gather from falling away and stringing out like the gather A in Fig. 1.

Fig. 3 shows the manner in which the retarding cup 10 acts upon the descending gather. When the gather is severed and first enters the cup, the lower end protrudes through the lower end of the opening 11 and the sides of the gather are caught at the lower edge of the opening, for example, on a line which, at a later stage, is the lower dotted line shown on Fig. 3. The gather then proceeds to work through the opening, as described above, and this continues until the point is reached at which the diameter of the gather is equal to the smallest diameter of the opening through the cup, at which time the gather is entirely released from the cup and falls freely into the mold. The portion of the gather which comes in contact with the cup during its process of working through the opening is designated by the space $a$ on Fig. 3, while the remaining length of the gather which falls freely after the thicker portion has worked through the cup is designated by the space $b$, Fig. 3.

It will be evident that the time during which the gather is delayed by the cup, and the particular shape thereby imparted to the gather, may be varied within extremely wide limits by altering the shape of the opening through the cup and by placing the cup at various distances below the shears.

Fig. 4 shows a modified form of my device including a metallic retarding cup consisting of an upper portion 15 which may be provided with openings 16 forming a water jacket for circulating cooling fluid, and a movable bottom portion 17. The upper portion 15 of the cup is provided with inner walls tapering upwardly and inwardly, and the bottom portion 17 has inner walls tapering downwardly and inwardly. The cup is intended to be adjusted to different heights with respect to the shears 7, and the bottom portion 17 is arranged to be held up against the upper portion 15 by any suitable means. These adjusting and holding means may be of any ordinary or desired construction and are therefore not illustrated. An arm 18, pivoted at 19, carries the lower portion 17 of the cup and is connected at its outer end to one end of a spring 20, the other end of which is connected at 21 to the upper portion 15 of the delaying cup, or to any other stationary portion of the apparatus. The spring 20 thus tends to move the lower portion 17 of the cup from its upper position, shown in full lines, to a lower position, shown in dotted lines.

When the feeder operates to deliver a gather of glass, the severed gather falls into the cup, as shown at C, the lower portion 17 of the cup being at this time raised and in contact with the upper portion. By suitable means the lower portion 17 is released at this time and the bottom of the cup swings downwardly under the combined influence of gravity and the spring 20, thereby releasing the gob and permitting it to fall freely into the mold, since the spring 20 causes the lower part of the cup to descend faster than the gather will fall under the action of gravity.

When the cup arrangement shown in Fig. 4 is placed so near the shears that the lower end of the gather is received in the cup before the gather is severed by the shears 7, the apparatus operates in substantially the manner shown in the application for Letters Patent of John R. Keller, filed May 13, 1921, Serial No. 469,125, on which Patent 1,608,601 was granted November 30, 1926.

My present method operates to control not only the shape of the gather but also its temperature. In all drop feeders the front or beginning of the gather is first exposed to the cooling action of the atmosphere and to the radiating influences of the walls of the discharge orifice through which it issues, and this exposure to cooling influences continues during practically the whole cycle of operation, whereas the rear or later portion of the gather issuing from the orifice is made of hotter glass taken from a point further inside the receptacle, and exposed a much shorter time to the various cooling influences. In consequence, gathers made in this manner are normally hotter in their upper portions than in their lower portions. This is a disadvantage, because in the forming of most articles, especially bottles and other hollow-ware, and more especially in that class of bottles styled "narrow-neck bottles", it is desirable to have the point or lower end of the gather hot, and the sides somewhat cooler. The point forms the neck or finish and chills more readily than the other portions of the bottle. In the method here disclosed the point does not come in contact with the delaying cup and remains hot, whereas the sides of the gather are slightly chilled by reason of their contact with the sides of the cup, so that the average temperature of the gather as it leaves the cup and falls into the mold is better adapted for fabrication than ordinary drop-fed gathers.

The retarding of the gather as it falls has the further advantage that there is less variation in the weight of the gather than if it is allowed to stretch indefinitely, as shown in Fig. 1. It will also be evident that by adjusting the position of the cup with respect to the opening an almost unlimited range of temperature can be employed in the glass and the gather will still be kept in one continuous piece, whereas in ordinary forms of gather feeders the practical range of temperature is very limited.

For the best operation of my invention it is desirable to cut off the gather close to the discharge opening of the receptacle, which causes the gather on issuing from the orifice to assume a blunt globular shape, followed by a gradually diminishing section. The end of the gather will then pause and pass through the restricted lower end of the delaying cup and this will occur in less time than the restricted upper end of the gather requires to compress and thicken laterally, so that a small amount of glass working through the restricted lower end of the cup will relieve the support of the glass and the balance or upper end of the gather will pass freely through the opening, as shown in Fig. 3, since it is of considerably smaller diameter.

In the form of delaying cup shown in Figs. 2 and 3 the time of delaying the gather depends upon the temperature of the glass, and the size of the gather relative to the size of the restricted opening. In the apparatus of Fig. 4, however, the time can be definitely controlled by controlling the movement of the bottom piece 17 by any suitable timing mechanism, so that the operation of this form of my invention is more positive than that of the form shown in Figs. 2 and 3.

In all gob feeders it is desirable, if not absolutely necessary, to place the molds considerably below the orifice of the receptacle, so as to give plenty of room for the shears and below them for a deflector to carry the gathers away to the cullet pile whenever the forming machine is stopped during the operation of the feeder. For this and other reasons the molds are placed some distance below the glass outlet, which is a disadvantage in ordinary forms of drop feeders where drops of considerable size are being fed. The use of a delaying cup, such as those disclosed herein, makes the distance between the orifice and the mold of no great importance because the shape of the gather depends entirely upon the position and operation of the delaying cup.

It will be understood that the details of construction herein shown may be modified in many respects without departing from my invention, and I therefore desire that my invention be limited only by the scope of the appended claims.

I claim as my invention:

1. The method of feeding molten glass that comprises detaching a suspended mass of glass from a parent body, thereafter temporarily engaging the said mass near its lower end, but without engaging the bottom of said mass or the upper portion thereof, to retard the fall thereof sufficiently to prevent substantial elongation of said mass, and receiving the said mass in a mold.

2. The method of feeding molten glass that comprises successively detaching a series of suspended masses of glass from a parent body, temporarily applying a force to the lower portion only of each mass, after detachment, to retard it sufficiently to prevent substantial elongation thereof, and receiving the said mass in a mold.

3. The method of feeding molten glass that comprises detaching a mass of glass from a parent body, allowing the detached mass to fall into a mold and applying a shaping force to the lower end portion only of said mass after detachment and while the said mass is falling from the point of detachment to the mold.

4. The method of feeding molten glass that comprises successively detaching a series of masses of glass from a parent body, allowing each detached mass to fall into a mold, and temporarily applying a shaping force at the lower end portion only of each mass after detachment and while the said mass is falling from the point of detachment to the mold.

5. The method of feeding molten glass that comprises forming a suspended mass of glass, severing the said mass from the parent body for delivery to a mold, and temporarily retarding the fall of the lower end portion only of said mass by a force applied thereto after detachment and between the point of severing and the mold.

6. The method of feeding molten glass that comprises passing the glass downwardly through an orifice, periodically detaching successive masses of glass from the parent body, temporarily retarding the fall of the lower portion of each mass by force applied at the lower end portion only of the mass and after said mass is severed, and receiving each of said masses in a mold.

7. The method of feeding molten glass that comprises detaching a freely hanging mass of glass from a parent body, controlling the shape of the said mass by causing it to fall, after severing, through an integral annular member adapted to temporarily retard the fall of the lower end portion of said mass, without contact with the upper portion thereof, and thereafter permitting the said mass to fall into a mold.

8. The method of feeding molten glass that comprises passing the glass downwardly through an orifice, detaching successive masses of glass from the parent body, controlling the shape of each mass by causing it to fall, after severing, through an integral annular member adapted to temporarily retard the fall of the lower end portion only of the said mass, and thereafter permitting the said mass to pass through said member and fall into a mold.

9. The method of feeding glass that comprises detaching a freely-hanging mass of molten glass from a parent body, thereafter receiving the said mass in an integral annular member adapted to confine the sides of the said mass below the point of detachment, said member temporarily retarding the fall of the lower end portion only of the said mass and controlling its shape, and thereafter allowing the said mass to pass through said member and fall into a mold.

10. The method of feeding glass that comprises successively detaching a series of freely hanging masses of molten glass from a parent body of glass, receiving each of said masses after detachment in an annular member adapted to confine the sides of each mass below the point of detachment, said member temporarily retarding the fall of the lower portion only of said mass and controlling its shape, and thereafter allowing the said mass to fall into a mold.

11. The method of feeding glass that comprises causing a mass of molten glass to fall by gravity into a mold and after said fall begins temporarily checking the fall of the lower end portion only of the said mass and thereby modifying the shape thereof.

12. The method of feeding glass that comprises detaching a suspended mass of molten glass from a parent body, temporarily applying shaping force to the lower end portion only of said mass below the point of attachment and after severing, and thereafter permitting the said mass to fall freely into a mold while substantially retaining the artificial shape produced by the said shaping force.

In testimony whereof, I, the said GEORGE E. HOWARD, have hereunto set my hand.

GEORGE E. HOWARD.